(12) United States Patent
Laitinen et al.

(10) Patent No.: US 8,661,257 B2
(45) Date of Patent: Feb. 25, 2014

(54) GENERIC BOOTSTRAPPING ARCHITECTURE USAGE WITH WEB APPLICATIONS AND WEB PAGES

(75) Inventors: Pekka J. Laitinen, Helsinki (FI); Silke Holtmanns, Klaukkala (FI)

(73) Assignee: Nokia Corporation, Espoo (FI)

( * ) Notice: Subject to any disclaimer, the term of this patent is extended or adjusted under 35 U.S.C. 154(b) by 497 days.

(21) Appl. No.: 12/782,199

(22) Filed: May 18, 2010

(65) Prior Publication Data

US 2011/0289315 A1 Nov. 24, 2011

(51) Int. Cl.
*H04L 9/32* (2006.01)

(52) U.S. Cl.
USPC .......................................... 713/171; 713/170

(58) Field of Classification Search
USPC ................. 713/150, 155–156, 168, 170–171; 380/277–278, 283
See application file for complete search history.

(56) References Cited

U.S. PATENT DOCUMENTS

| 2003/0061404 | A1 | 3/2003 | Atwal et al. ................... 709/328 |
| 2005/0102501 | A1 | 5/2005 | Haukka et al. .................. 713/55 |
| 2005/0125661 | A1 | 6/2005 | Vaidyanathan ............... 713/166 |
| 2005/0246548 | A1 | 11/2005 | Laitinen ......................... 713/182 |
| 2006/0101270 | A1* | 5/2006 | Laitinen ......................... 713/176 |
| 2006/0174117 | A1* | 8/2006 | Laitinen ......................... 713/169 |
| 2006/0205387 | A1* | 9/2006 | Laitinen ......................... 455/411 |
| 2006/0206710 | A1* | 9/2006 | Gehrmann .................... 713/168 |
| 2006/0251257 | A1* | 11/2006 | Haverinen et al. ............ 380/270 |
| 2007/0192838 | A1* | 8/2007 | Laitinen et al. ................... 726/4 |
| 2007/0223703 | A1 | 9/2007 | Verma et al. .................. 380/278 |
| 2009/0037727 | A1* | 2/2009 | Pritikin ......................... 713/156 |
| 2009/0106550 | A1 | 4/2009 | Mohamed ..................... 713/156 |
| 2009/0209232 | A1* | 8/2009 | Cha et al. ....................... 455/411 |
| 2010/0031355 | A1 | 2/2010 | Dik et al. ......................... 726/22 |
| 2010/0165388 | A1 | 7/2010 | Ikeura ......................... 385/1.15 |
| 2010/0306854 | A1 | 12/2010 | Neergaard ..................... 726/26 |
| 2011/0302627 | A1* | 12/2011 | Blom et al. ....................... 726/2 |
| 2012/0027211 | A1* | 2/2012 | Lehtovirta et al. ............ 380/255 |

FOREIGN PATENT DOCUMENTS

| WO | WO 2006/085207 A1 | 8/2006 |
| WO | WO 2010/095988 A1 | 8/2010 |
| WO | WO 2010/114475 A2 | 10/2010 |

OTHER PUBLICATIONS

3GPP TS 33.220 version 8.5.0 Release 8 Technical Specification, Jan. 2009.*
Bajkó, Gábor. "Generic Bootstrapping Architecture (GBA) Framework, 3rd Generation Partnership Project 2 '3GPP2'", 3GPP2 S.S0109-0, version 1.0, Mar. 30, 2006.*
Zhang, et al., "Securing Elastic Applications on Mobile Devices for Cloud Computing", (Nov. 2009), (8 pages).
Android Developers. Signing Your Applications. (9 pages) http://developer.android.com/guide/publishing/app-signing.html.

(Continued)

*Primary Examiner* — Darren B Schwartz
(74) *Attorney, Agent, or Firm* — Harrington & Smith

(57) ABSTRACT

A method includes receiving at a network application function a request related to a generic bootstrapping architecture key originated from a user equipment. The received request includes a network application function identifier that includes a uniform resource locator, where the network application function has a fully qualified domain name. The method further includes causing a generic bootstrapping architecture key to be generated for the user equipment based at least in part on the uniform resource locator that is part of the network application function identifier. Apparatus and computer programs for performing the method are also disclosed.

18 Claims, 6 Drawing Sheets

(56) References Cited

OTHER PUBLICATIONS

Google Code. Google Projects for Android: Google APIs. (4 pages) © 2010 Google. http://code.google.com/android/add-ons/google-apis/maps-overview.html.

ClaimID. About ClaimID. Manage your online identity. (2 pages) © 2009 claimID.com, Inc. http://claimid.com/about.

Forum.Nokia.com. Web Runtime Widgets. (4 pages) http://www.forum.nokia.com/Technology_Topics/Web_Technologies/Web_Runtime/.

W3C. Cross-Origin Resource Sharing. W3C Working Draft Mar. 17, 2009. (26 pages) http://www.w3.org/TR/2009/WD-cors-20090317/ Editor: Anne van Kesteren. © 2008 W3C®.

W3C. Digital Signatures for Widgets. W3C Working Draft Apr. 15, 2010. (19 pages) http://www.w3.org/TR/2010/WD-widgets-digsig-20100415/ Editors: F. Hirsch, M. Caceres, M. Priestley. © 2010 W3C®.

W3C. HTML5 A vocabulary and associated APIs for HTML and XHTML. W3C Working Draft Mar. 4, 2010. (21 pages) http://www.w3.org/TR/2010/WD-html5-20100304/ Editors: Ian Hickson, David Hyatt. © 2010 W3C®.

W3C. Widget Packaging and Configuration. W3C Candidate Recommendation Dec. 1, 2009. (48 pages) http://www.w3.org/TR/2009/CR-widgets-20091201/ Editor: Marcos Caceres. © 2009 W3C®.

3GPP TS 24.109 V9.0.0 (Dec. 2009). Technical Specification Group Core Network and Terminals; Bootstrapping interface (Ub) and network application function interface (Ua); Protocol details (Release 9). (70 pages) © 2009, 3GPP Organizational Partners.

3GPP TS 33.220 V9.2.0 (Dec. 2009). Technical Specification Group Services and System Aspects; Generic Authentication Architecture (GAA); Generic bootstrapping architecture (Release 9). (75 pages) © 2009, 3GPP Organizational Partners.

3GPP TR 33.980 V9.0.0 (Dec. 2009), 3$^{rd}$ Generation Partnership Project; Technical Specification Group Services and System Aspects; Liberty Alliance and 3GPP Security Interworking; Interworking of Liberty Alliance Identity Federation Framework (ID-FF), Identity Web Services Framework (ID-WSF) and Generic Authentication Architecture (GAA) (Release 9), (39 pages).

* cited by examiner

GENERIC BOOTSTRAPPING ARCHITECTURE USAGE WITH WEB APPLICATIONS AND WEB PAGES

TECHNICAL FIELD

The exemplary and non-limiting embodiments of this invention relate generally to wireless communication systems, methods, devices and computer programs and, more specifically, relate to the generic bootstrapping architecture and enhancements thereto.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

AKA authentication and key agreement
API application program interface
AUTN authentication token
AV authentication vector
BSF bootstrapping server function
B-TID boostrapping transaction identifier
CA certification authority
CK cipher key
CSS cascading style sheets
DNS domain name server
FQDN fully qualified domain name
GBA generic bootstrapping architecture
GBA_U GBA with UICC-based enhancements
GUSS GBA user security settings
HLR home location register
HSS home subscriber system
HTTP hypertext transfer protocol
HTTPS hypertext transfer protocol secure
IK integrity key
IMPI IMS private user identity
IMS IP multimedia subsystem
IP interne protocol
Ks_ext_NAF derived key in GBA_U
MBMS multimedia broadcast multicast service
NAF network application function
NAF_ID network application function identifier
RAND random challenge
SLF subscriber locator function
TLS transport layer security
TMPI temporary IMPI
UE user equipment
UICC universal integrated circuit card
URI uniform resource identifier
URL uniform resource locator
XRES expected response One specification of interest herein is 3GPP TS 33.220 V9.2.0 (2009-12) Technical Specification 3rd Generation Partnership Project; Technical Specification Group Services and System Aspects; Generic Authentication Architecture (GAA); Generic bootstrapping architecture (Release 9), referred to hereafter for convenience as 3GPP TS 33.220. FIG. 1 herein reproduces Figure 4.1 of 3GPP TS 33.220, "Simple network model for bootstrapping involving HSS, respectively HLR with Zh, resp Zh'reference point", while FIG. 2 herein reproduces Figure 4.3 of 3GPP TS 33.220, "The bootstrapping procedure". It can be noted that variations of this procedure exist, which can be found in the same document.

Also of interest herein is 3GPP TS 24.109 V9.0.0 (2009-12) Technical Specification 3rd Generation Partnership Project; Technical Specification Group Core Network and Terminals; Bootstrapping interface (Ub) and network application function interface (Ua); Protocol details (Release 9).

FIG. 1 depicts a simple network model of the entities involved in the bootstrapping approach when a HSS with Zn reference point is deployed, and the various reference points (e.g., the interfaces Ub, Ua, Zn, Zn', Dz) used between them. Alternatively, a HLR with a Zh' interface can be deployed.

When the UE wants to interact with a network application server (NAF), and it knows that the bootstrapping procedure is needed, it first performs bootstrapping authentication as shown in FIG. 2, otherwise, the UE performs bootstrapping authentication only when it has received a bootstrapping initiation required message or a bootstrapping negotiation indication from the NAF, or when the lifetime of a key in the UE has expired.

The UE always includes the product token "3gpp-gba-tmpi" in a user agent request-header field when communicating over Ub. The BSF always includes the product token "3gpp-gba-tmpi" in the server response-header field when communicating over Ub.

The following steps are performed in the basic bootstrapping procedure shown in FIG. 2.

(1) The UE sends an HTTP request towards the BSF. When a TMPI associated with the IMPI in use is available on the UE, the UE includes this TMPI in the "username" parameter, otherwise the UE includes the IMPI.

(2) The BSF recognizes from the structure of the "username" parameter whether a TMPI or an IMPI was sent. If a TMPI was sent the BSF looks up the corresponding IMPI in its local database. If the BSF does not find an IMPI corresponding to the received TMPI it returns an appropriate error message to the UE. The UE then deletes the TMPI and retries the request using the IMPI.

The BSF retrieves the complete set of GBA user security settings and one Authentication Vector (AV, AV=RAND∥AUTN∥XRES∥CK∥IK) over the reference point Zh from the HSS (where ∥ indicates concatenation). A similar construct exists for a 2G HLR.

In the case that no HSS with the Zh reference point is deployed, the BSF retrieves the Authentication Vector over a reference point Zh' from either an HLR or an HSS with Zh' reference point support. The Zh' reference point is defined to be used between the BSF and the HLR, and allows the BSF to fetch required authentication information (see 3GPP TS 33.220, clause 4.3.6 and clause 4.4.12).

If the BSF implements a timestamp option and has a local copy of the GUSS for the subscriber that has been fetched from the HSS during a previous bootstrapping procedure, and this GUSS includes a timestamp, the BSF may include the GUSS timestamp in the request message. Upon receiving that timestamp, if the HSS implements the timestamp option, the HSS may compare it with the timestamp of the GUSS stored in the HSS. In this case, if and only if the HSS has done the comparison and the timestamps are equal, then the HSS sends a "GUSS TIMESTAMP EQUAL" indication to the BSF. In any other case, the HSS sends the GUSS (if available) to the BSF. If the BSF receives "GUSS TIMESTAMP EQUAL"

indication, it keeps the local copy of the GUSS. In any other case, the BSF deletes the local copy of the GUSS and stores the received GUSS (if sent).

(3) The BSF forwards the RAND and AUTN to the UE in a 401 message (without the CK, IK and)(RES). This is to demand the UE to authenticate itself.

(4) The UE checks the AUTN to verify that the challenge is from an authorized network; the UE also calculates CK, IK and RES. This will result in session keys IK and CK in both the BSF and the UE.

(5) The UE sends another HTTP request, containing the Digest AKA response (calculated using RES), to the BSF.

(6) The BSF authenticates the UE by verifying the Digest AKA response.

(7) The BSF generates key material Ks by concatenating CK and IK. The B-TID value is also generated in format of NAI by taking the base64 encoded RAND value from step (3), and the BSF server name, i.e.:

base64encode(RAND)@BSF_servers_domain_name.

If the request included the product token "3gpp-gba-tmpi" in the user agent request-header field the BSF computes a new TMPI stores it together with the IMPI, overwriting a previous TMPI related to this IMPI, if any.

(8) The BSF sends a 200 OK message, including a B-TID, to the UE to indicate the success of the authentication. In addition, in the 200 OK message, the BSF supplies the lifetime of the key Ks. The key material Ks is generated in UE by concatenating CK and IK.

(9) Both the UE and the BSF use the Ks to derive the key material Ks_NAF during the procedures as specified in clausec4.5.3. Ks_NAF is used for securing the reference point Ua.

To allow consistent key derivation based on the NAF name in the UE and the BSF, at least one of the three following prerequisites has to be fulfilled:

(a) The NAF is known in a DNS under one domain name (FQDN) only, i.e., no two different domain names point to the IP address of the NAF. This is achieved by administrative means.

(b) Each DNS entry of the NAF points to a different IP address. The NAF responds to all of these IP addresses. Each IP address is tied to the corresponding FQDN by NAF configuration. The NAF can determine from the IP address which FQDN to use for key derivation.

(c) The Ua uses a protocol which transfers the host name (FQDN of NAF as used by the UE) to the NAF (e.g. HTTP/1.1 with mandatory Host request header field). This requires the NAF to check the validity of the host name, and to use this name in all communication with the UE where appropriate, and to transfer this name to the BSF to allow for correct derivation of Ks_NAF.

The UE and the BSF store the key Ks with the associated B-TID for further use, until the lifetime of Ks has expired, or until the key Ks is updated, or until deletion conditions are satisfied.

A newly evolving HTML5 specification (HTML5: A vocabulary and associated APIs for HTML and XHTML, Working Draft, http://www.w3.org/TR/html5/) is expected to increase Web application development. One potential result will be an increased usage of Web applications in mobile devices. However, it has been realized that for the further development of Web applications the usage of the HTTP Digest with GBA, in its conventional form as defined in, for example, 3GPP TS 33.220, may not be adequate to ensure the security of the usage of such applications. Users may have different security associations open from their browsers at the same time to the same server hosting different applications. The current GBA security architecture does not solve the problem of providing separate security associations to each of those applications. This may result in a security vulnerability for popular service providers.

SUMMARY

The foregoing and other problems are overcome, and other advantages are realized, in accordance with the exemplary embodiments of this invention.

In accordance with a first aspect of the exemplary embodiments of this invention a method includes receiving at a network application function a request related to a generic bootstrapping architecture key originated from a user equipment, the received request comprising a network application function identifier that comprises a uniform resource locator. The network application function has a fully qualified domain name. The method further includes causing a generic bootstrapping architecture key to be generated for the user equipment based at least in part on the uniform resource locator that comprises part of the network application function identifier.

In accordance with a further aspect of the exemplary embodiments an apparatus comprises a processor and a memory including computer program code. The memory and computer program code are configured to, with the processor, cause the apparatus at least to receive at a network application function a request related to a generic bootstrapping architecture key originated from a user equipment, the received request comprising a network application function identifier that comprises a uniform resource locator, where the network application function has a fully qualified domain name. The apparatus is further configured to cause a generic bootstrapping architecture key to be generated for the user equipment based at least in part on the uniform resource locator that comprises part of the network application function identifier.

BRIEF DESCRIPTION OF THE DRAWINGS

The foregoing and other aspects of the exemplary embodiments of this invention are made more evident in the following Detailed Description, when read in conjunction with the attached Drawing Figures, wherein.

DETAILED DESCRIPTION

Figure 1:
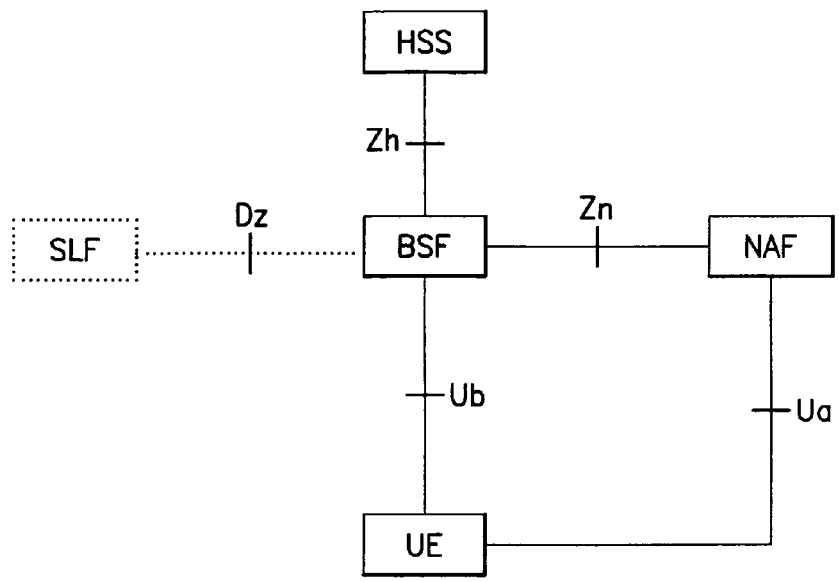
FIG. 1 reproduces FIG. 4.1 of 3GPP TS 33.220, "Simple network model for bootstrapping involving HSS with Zh reference point".

It is noted that JAVA and JAVASCRIPT are registered trademarks of Sun Microsystems Incorporated. FACEBOOK is an applied for service mark of Facebook, Inc.

An aspect of the exemplary embodiments of this invention is to enhance GBA for at least enabling the secure usage of GBA with Web applications.

Relatedly, the exemplary embodiments enable a simple call (e.g., a Javascript call) to a UE platform which returns a NAF-specific key with the B-TID and other relevant information about the bootstrapping session. However, this functionality has implications for the GBA core functionality, as currently its usage has been designed for use with protocols such as MBMS, HTTP Digest and TLS, where each protocol is provided by one service server. Note that the basic GBA was designed before the introduction of some modern services, such as those represented by some social networking sites, and, hence, does not take into account the special set-up of the servers.

The ensuing description discusses these implications and provides solutions to solve them without impacting existing protocols.

As considered herein the term "Web applications" means both Web applications themselves and Web pages that utilize Javascript. The web application is executed in the mobile terminal, but may request additional information from external sources also.

There are at least two contexts where GBA can be used within Javascript.

A first context is a Web application, where the Web application is typically installed to a mobile device (e.g., UE). The format of the Web application can be specified in, for example, a W3C Widget specification (Widget Packaging and Configuration, Candidate Recommendation, http://www.w3.org/TR/widgets/) or a Nokia WRT Widget specification (Web Runtime widgets, Nokia Forum, http://www.forum.nokia.com/Technology_Topic s/Web_Technologies/Web_Runtime/).

The Web application can use, for example, HTML, Javascript and CSS to present information to the user.

CSS (cascading style sheets) is a feature of HTML 4 that enables a developer to specify formatting in one location and have the formatting propagated. As one example, in one location the developer can determine the formatting of all headers.

A second context is the Web page, where the web page uses HTML, Javascript and CSS to present information to the user. A Web page is typically presented in a Web browser.

One major difference between a Web application (widget) and a Web page is that a widget is typically installed on the device and executed locally on the device. The Web page on the other hand is downloaded to the device from a Web server, and then executed locally on the device. In the former case, the widget typically executes in a Web Runtime, or similar environment, and the latter in a Web browser.

Exemplary use cases for GBA usage within Javascript are authentication of the subscriber and encryption and decryption of data using the Ks_(ext)_NAF key. The authentication use case can be readily integrated with existing authentication schemes where HTML FORM is used. The end user typically sees this as a username/password box on the web page. GBA with Javascript support can replace this by replacing the username with the B-TID and the password with the Ks_(ext)_NAF key. The key can be used either directly or used together with a server-side challenge to form a hash value. The encryption/decryption use case can be implemented using Javascript, and the Javascript would obtain the key from the phone platform. Alternatively, the key could be derived and be web application specific.

A benefit of the usage of GBA in Javascript is the flexibility provided, as Javascript code utilizing the Ks_(ext)_NAF key can be easily modified.

Discussed first is a Ua security protocol identifier. As can be seen in FIG. 1 the Ua is the reference point between the UE and the NAF.

In order to distinguish GBA keys in a protocol level from other protocols, there is need to specify (at least one) new Ua security protocol identifier for Web programming. This identifier is used when Javascript is running on, for example, a Web browser. The Javascript is then able to request GBA keys from the UE (e.g., phone) platform. With further enhancements discussed below diversifying keys and key separation for Web programming and, more specifically, for Javascript is possible to achieve. This ensures that if one key is compromised, not all the security associations of other services are compromised.

Discussed now is the concept of granularity. According to the current GBA specification a NAF_ID identifies the NAF only in the FQDN (=DNS name) level. This is sufficient for protocols such as TLS where the server is identified by the FQDN only. However, it has become common with Web programming that the server may be providing multiple services in the same server, and these services may be provided by a third party that has a service agreement with the server operator.

One non-limiting definition of the currently used FQDN approach is that it is a complete domain name for a specific computer (host) on the Internet. The FQDN provides enough information so that it can be converted into a physical IP address. The FQDN consists of a host name and a domain name. For example, www.xyz.com is a FQDN where [www] is the host, [xyz] is the domain name, and [.com] is the top level domain (TLD) name.

For example, Facebook has a server apps.facebook.com where the services are actually identified by the URL, and not only by the FQDN. Thus, apps.facebook.com/service1 and apps.facebook.com/service2 may be operated by two different service providers even though they are running on the same server. This scheme does not fit the current version of GBA as the NAF that is specific to both instances would result in exactly the same key(s) being generated. This would imply that both services would have the same security association with the user, and can lead to the undesirable situation that service1 may obtain user data from service2. Note that this may be particularly critical if one of the services is, for example, a payment service.

One solution to this problem is to extend the NAF_ID construction without violating the existing usage. Instead of using only the FQDN in the NAF_ID, the entire URL is used instead. This approach provides sufficient granularity when constructing the NAF_ID and enables having different keys for different services in GBA. The logic would be that with a Ua security protocol identifier indicating the Web application usage, the NAF_ID construction would be different.

Discussed now, in accordance with an aspect of the exemplary embodiments of this invention, is the concept of NAF_ID authorization in the BSF. If the NAF_ID can include more than just the FQDN and the Ua protocol identifier, the question arises as to how the BSF can check that a NAF is authorized to use a particular URL. In a simple case the BSF can use the current approach with a modification: i.e., the BSF can check whether the FQDN portion of the URL matches the FQDN that the particular NAF is authorized to request GBA keys for. This is sufficient as all HTTP requests with the same FQDN are routed to a single administrative domain that is owned by a single server operator, i.e., the NAF. The NAF operator is then hosting the actual services that can belong to the third parties. Thus, the BSF performs coarse grained access control to validate that a particular NAF is authorized to handle the URL. This is based on the FQDN that is present in the URL. The NAF would perform the fine grained access control to validate which application running on its server is able to access a particular key. This is based on the non-FQDN part of the URL.

Figure 3:
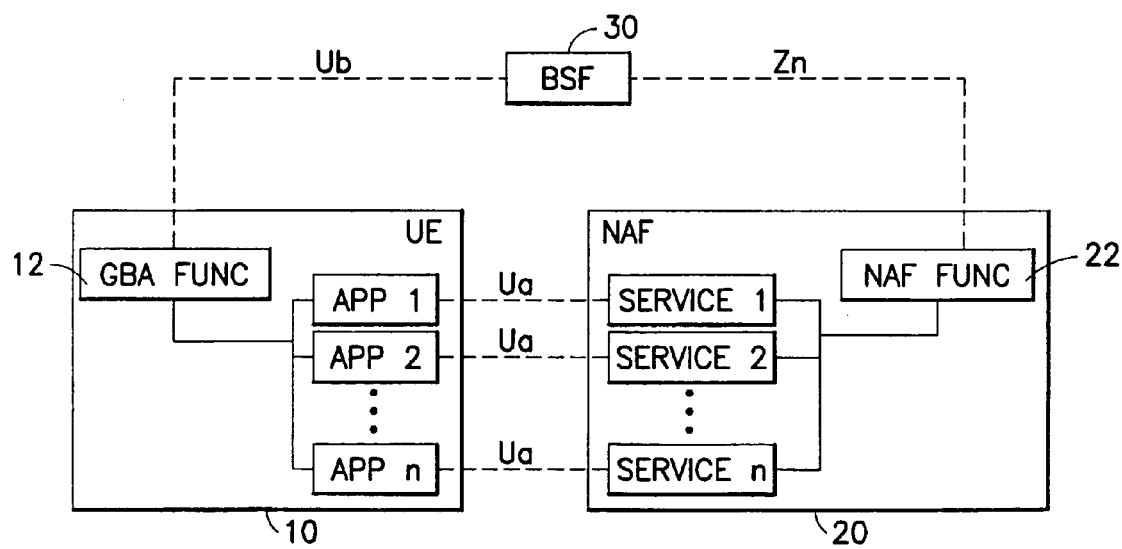
FIG. 3 shows an exemplary architecture of a multi-service provider NAF.
Figure 2:
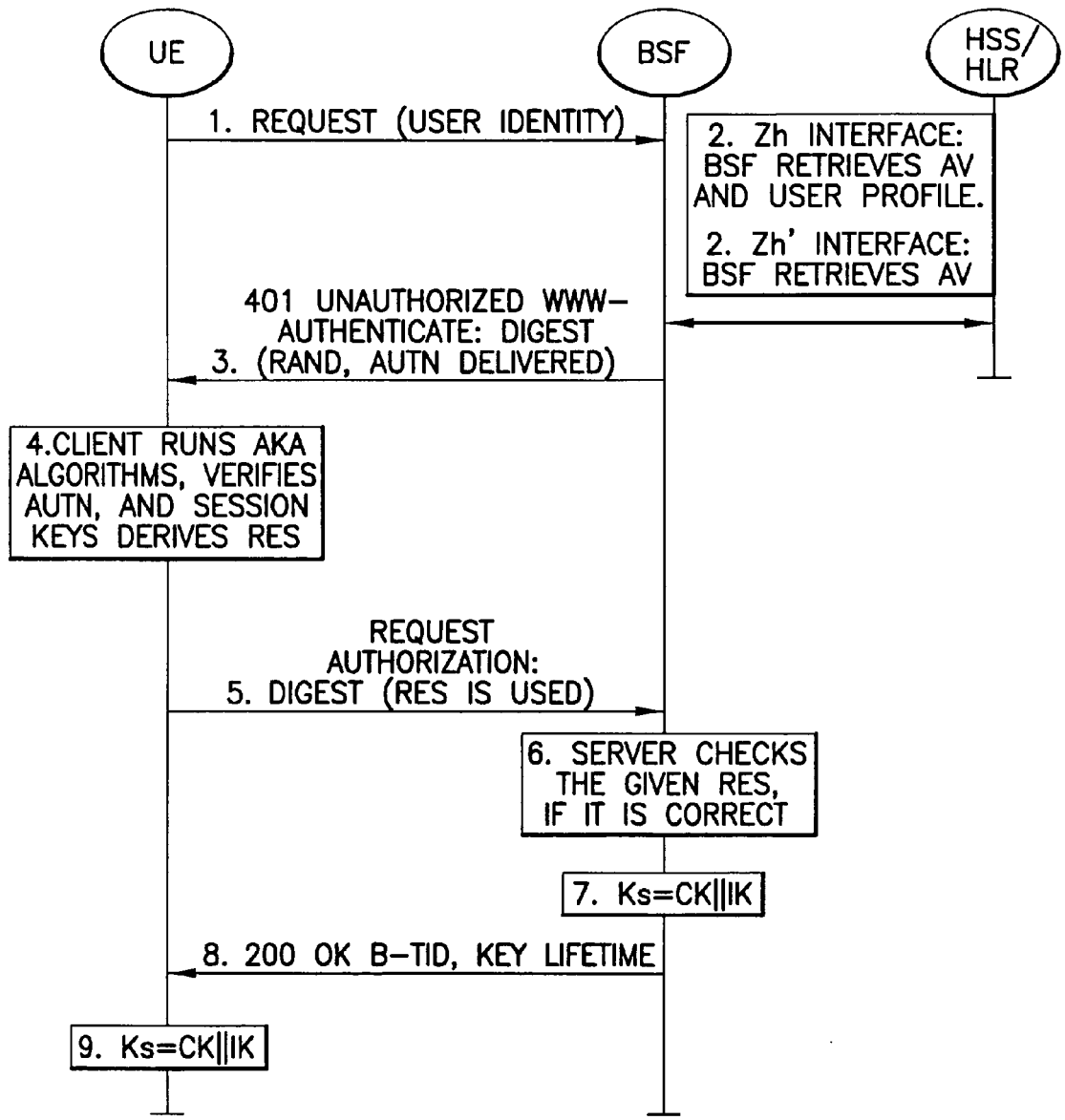
FIG. 2 reproduces FIG. 4.3 of 3GPP TS 33.220, "The bootstrapping procedure".

Discussed now is the concept of NAF_ID authorization in the NAF. Reference is made to FIG. 3, which shows a UE 10, a NAF 20 and a BSF 30, and which illustrates a situation where the NAF 20 is hosting multiple services (service_1, service_2, . . . , service_n that are operated by different parties. In this example the NAF 20 is running a single server platform that needs to enforce access control when the services are requesting GBA keys. The NAF 20 is assumed to include a NAF function 22, and the UE 10 is assumed to include a GBA function 12.

In FIG. 3 it is assumed that the NAF 30 server hosts a platform that is capable of running multiple services, where services can be operated by different parties. In this scenario it is necessary to enforce key diversity between each service, as otherwise any application (app_1, app_2, app_n) in the UE 10 can access any service in the NAF 20. In other words, with the existing GBA architecture, where the NAF JD consists of only the FQDN of the NAF, the key to access each service would be the same when the Ua protocol (the protocol used for the service) is the same.

With the enhancement of the NAF_ID granularity discussed above it becomes possible to have different keys for each service hosted in the NAF 20. However, the NAF operator should be able to limit access to the keys in such a way that only authorized services have access to their keys. One solution to this problem is to provide the NAF function 22 within the NAF 20 server, through which each service requests GBA keys. When a service requests a key it provides the used NAF_ID (i.e., URL with Ua security protocol identifier) and the NAF function 22 checks that the corresponding service is authorized to access the requested keys. In a simple case this can be performed by making a check against the allowed URL(s) for the service. If access is granted then the NAF function 22 forwards the request to the BSF 30. The BSF 30 then performs the authorization check as was described above with respect to the concept of NAF_ID authorization in the BSF.

Discussed now is the URL authorization first with respect to the Web page case and then with respect to the Web application case.

In the Web page case assume that a service is accessed in a server based on the URL. The URL contains the service-specific part which may also include an additional part, e.g., parameters. Thus, the format and content of the URL may change in each HTTP request that is sent to the NAF 20. As a result, it is an aspect of the exemplary embodiments that a service is allowed to modify or "trim" the URL in such a way that it becomes more generic, e.g., all the way to the root of the server (e.g., "http://apps.operator.com") to generalize the key if necessary before it is submitted to the NAF function 22 for inspection. However, the service preferably is not allowed to concatenate the URL with arbitrary strings, as this would allow the service to obtain a key that it is not authorized to obtain. Similarly, the UE 10 would enforce the same rule for the applications.

As a non-limiting example, assume that a Web page has been loaded to a browser from http://apps.operator.com/service1/init. Javascript executing on that Web page is allowed to use the following URLs (which are enforced by the browser platform hosting the web page):

http://apps.operator.com/service1/init
http://apps.operator.com/service1/
http://apps.operator.com/service1
http://apps.operator.com.

However, the Javascript is not allowed to use the following URLs:

http://apps.operator.com/service2
http://apps2.operator.com.

If such an enforcement scheme is guaranteed then the NAF 20 can be certain that the Web page is allowed access to only those GBA keys that have been derived from the acceptable URLs. One benefit of this is that authorization to GBA keys in the UE 10 can be made automatic, as the Web page would have access to only those GBA keys that are derived from the URL from which the Web page was downloaded. The Web page can only make the GBA key more "generic" by removing parts of the URL from the "least significant part", but it cannot access GBA keys belong to other services running on the NAF 20.

Similarly, the NAF function 22 enforces the URL trimming, and allows access to a more generic URL, while not allowing the service to concatenate the URL with some arbitrary string.

When such URL usage enforcements are in place in both of the UE 10 and the NAF 20, then it can be guaranteed that only authorized services (Web pages in the UE 10 and services in the NAF 20) have access to GBA keys (and not some other service(s)).

In the Web application case the application is installed on the device (e.g., on the UE 10) and thus there is no default mechanism similar to the Web page case to handle the URL authorization (as the application is running locally on the UE 10). Thus, a mechanism is needed to perform the URL authorization.

A Web application can be digitally signed or some parts of it might be digitally signed. In this case the signer of the Web application may either have a signing key that has been certified by a trusted authority or a certification authority (CA) or other trusted entity, i.e., the signer has a valid certificate from the CA, or the signing key is accompanied by a self-signed certificate. In accordance with an aspect of the exemplary embodiments of this invention there are a plurality of trust levels established, e.g., three trust levels, for Web applications and depending on the trust level, the Web application may have access to one or more GBA keys associated with an URL.

Trust level 2: The Web application is digitally signed, and the signer has a certificate from a CA. Additionally, either the CA itself, or the signer, has been designated as "trusted" in the UE 10. In this case the Web application has full access to GBA keys, i.e., it can request any GBA key in the Web application context. That is, the Web application Ua security protocol identifier is always used. This type of Web application can typically be offered by either the mobile network operator or by the device vendor.

Trust level 1: The Web application is digitally signed, and the signer has either a certificate from a CA, or the signer has a self-signed certificate, and neither of the signer or the CA has been designated as "trusted" in the UE 10 or might be regarded as trustworthy based on a recommendation from other users. In this case the UE 10 controls access to the GBA keys. When a Web application with trust level 1 is accessing a GBA key the UE 10 validates the request by making a request to the server identified by the URL, and then checking whether the corresponding Web application is authorized to obtain the GBA key in question. If the access is granted the GBA key is given to the Web application. This can be one time grant, where each time the Web application requests access to the GBA key the UE 10 validates the request with the server, or it can be a blanket grant, where any subsequent GBA key requests are granted automatically. This process is described in further detail below. This type of Web application can typically be offered by third parties who also operate a third party NAF (i.e., the server that is being accessed) that have an agreement with the mobile network operator.

Trust level 0: The Web application is not digitally signed. In this case the Web application is not given access to GBA keys.

Note that the URL trimming described above can also be used by the Web applications, as they may additionally need to generate more generic GBA keys.

Figure 4:
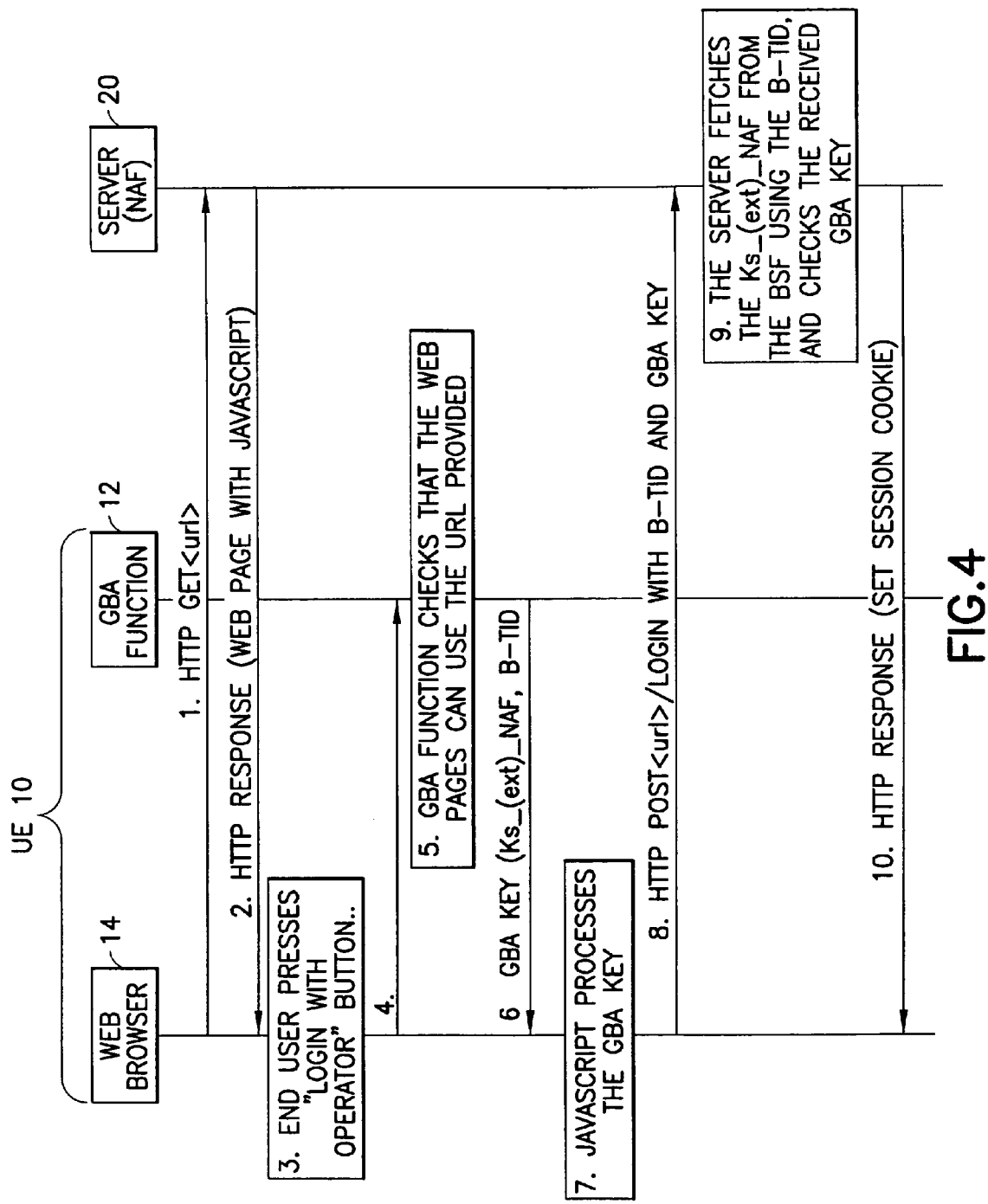
FIG. 4 depicts an exemplary sequence flow for GBA access from a Web page.
Figure 5:
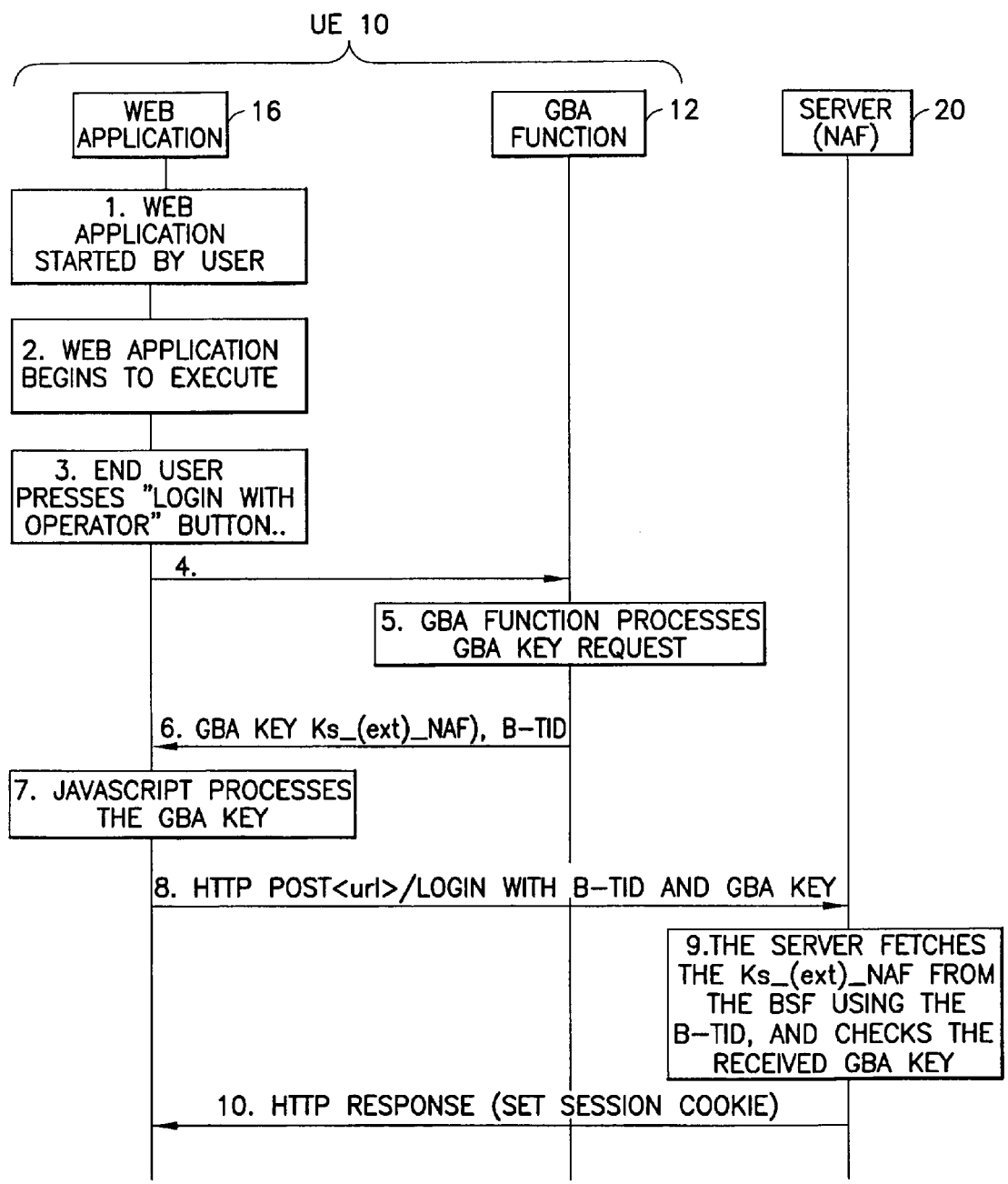
FIG. 5 depicts an exemplary sequence flow for GBA access from a Web application (widget).

Two sequence flows are next described with reference to FIGS. 4 and 5. FIG. 4 presents an example of a sequence flow for the Web page use case, while FIG. 5 presents an example of a sequence flow for the Web application use case.

FIG. 4 shows a sequence flow example depicting a procedure for a mobile network operator to implement GBA-based authentication with a Web server. This sequence flow can readily replace or co-exist with existing HTML form-based username/password authentication, and the Javascript on the Web page can detect whether GBA is available. The sequence flow of FIG. 4 assumes the presence of a Web browser 14 in the UE 10, along with the GBA function 12.

The (exemplary) sequence flow of FIG. 4 is as follows:

1. The end user selects to go a Web page. The browser 14 makes a conventional HTTP GET request to the URL of the server (NAF) 20.

2. The server 20 returns a 200 OK HTTP status message. The Web page contains Javascript that is capable of executing a GBA key request.

3. The Web page is constructed so that the end user is presented with a button, e.g., "Login with Operator". The button is connected to Javascript (onClick) in such a way that the GBA authentication is initiated when the button is pressed. When the end user presses the button step 4 is executed.

4. The Javascript of the Web page calls the GBA function 12 by using a getGBAKey(url) function. This results in a call to the GBA function 12 which handles the request.

5. Upon receiving a GBA key request from the browser 14, the GBA function 12 checks that the URL given to the GBA function by the Web page is the same or trimmed version of the Web page's own URL (in Javascript: document.location.href). If the validation is successful, the GBA function 12 allows access to the GBA key and derives the GBA key as follows: $Ks\_(ext)\_NAF=KDF(Ks, "gba-me", RAND, IMPI, NAF\_Id)$, where the NAF_Id is the URL concatenated with the new Ua security protocol identifier for the Web application context.

6. The derived GBA key with the B-TID is returned to the Web browser (i.e., the Javascript of the web page).

7. The Javascript of the Web page prepares the Web browser 12 to make a HTTP POST request to the server 20. The GBA key and the B-TID are to be sent to the server 20 in the HTTP payload.

8. The Web browser 14 makes the HTTP POST request with the GBA key and the B-TID in the HTTP payload.

9. The server (NAF) 20 extracts the B-TID from the HTTP request, and fetches the Ks_(ext)_NAF key from the BSF 30 over the Zn interface. After receiving the Ks_(ext)_NAF key from the BSF, the server 20 compares the received Ks_(ext)_NAF key with the key received from the UE 10. If the keys match, the server 20 marks the session as authenticated.

10. The server 20 sends a HTTP response to the web browser 14 indicating that the authentication was successful, and sets up a HTTP session cookie to handle the authenticated session.

It should be noted that a number of modifications may be made to the exemplary session flow described above with respect to FIG. 4. For example, in step 3 the Javascript or web code can detect whether the GBA function(s) 12 are available in the Web browser 14. If they are not the Javascript only enables the conventional username/password based authentication. If the GBA function(s) 12 are available in the Web browser 14 the "Login with Operator" button is also displayed (and optionally the normal username/password login is disabled).

Further by example, in step 7 the Javascript can calculate a server-specific authentication response based on the GBA key. A challenge may have been received in step 2, and when the GBA key is returned from the GBA function 12 the Javascript can calculate a hash of the GBA key and the challenge. In step 8, the authentication response is returned to the server 20 instead of the GBA key. The server 20, which can have a record of the challenge, then calculates the same hash when it receives the Ks_(ext)_NAF key from the BSF. If the hash calculated by the server 10 and the authentication response received from the web browser 14 match, the end user is authenticated.

Note again that the sequence flow described above is but one non-limiting example, as network operators can implement their own (custom) login procedures using Javascript-based GBA API.

FIG. 5 shows a sequence flow example depicting a procedure for the UE 10 to validate a Web application request for GBA keys.

The exemplary sequence flow is as follows.

1. A Web application 16 (e.g., a widget) is started by a user.

2. The Web application begins to execute.

Steps 3-10 are then similar to those described above with reference to FIG. 4. Note that in step 5 the GBA function processes the GBA request such that at step 6 the GBA key is returned to the Web application.

It should be noted that a number of modifications may be made to the exemplary session flow described above with respect to FIG. 5, as was described above with reference to FIG. 4.

It should be appreciated that the foregoing description has provided new use cases for GBA, for example, how to employ GBA in combination with Web applications and Web pages that use, for example, HTML5, Javascript and CSS. The exemplary embodiments provide, at least in part, new a Ua security protocol identifier to identify the Web application use case, for example, HTML5, Javascript and CSS. The exemplary embodiments also provide, at least in part, extensions to the NAF_ID format to include a full URL as opposed to just the FQDN.

The exemplary embodiments also provide, at least in part, an extended NAF_ID format. An example of the extended NAF_ID format is:

[protocol]FQDN[port][service], where

[protocol] specifies the user protocol, e.g., "http://" or "https://". In this extended NAF_ID format [port] specifies the port, if a default port is not used, e.g., ":8080". Note that in the HTTP case the usage of the default port ":80" will result in a different key being generated as compared to a case where the default port is not present in the URL (e.g., "http://example.com/" versus "http://example.com:80/"). In this extended NAF_ID format [service] specifies the service that is being accessed, e.g., "/service1/". In this extended NAF_ID format the Ua security protocol identifier is appended to the end of the URL before the Ks_(ext/int)_NAF is created:

[protocol]FQDN[port][service][UaSecProtED].

The exemplary embodiments also provide a NAF_ID (URL authorization) to enforce access control as to which instances of the architecture have access to which GBA keys. For example, there can be a URL check in the BSF 30, where the FQDN of the NAF 20 is part of the URL. Further by example, there can be a URL check in the NAF 20, where the NAF function 22 can check that a particular service is allowed to use the URL. Further by example, there can be a URL check in the UE 10, where the UE 10 can check that a particular Web page is allowed to use the URL.

The exemplary embodiments also support the use of URL trimming in the UE 10 and in the NAF application 22 to enable a GBA key to be made more generic.

The exemplary embodiments also provide for URL checking between the UE 10 and the NAF 20, where the UE 10 can query the NAF 20 as to whether a certain signer is allowed access to the URL.

It should be further appreciated that the exemplary embodiments are not limited to a single Ua security protocol identifier for use with Web applications and Web pages. Instead, the exemplary embodiments also encompass a case where there are multiple Ua security protocol identifiers. Thus, the foregoing references to a Ua security protocol should be understood to include the possibility of more than one Ua security protocol identifier for the Web application/Web page context.

In general, the choice of which Ua security protocol identifier to use depends at least in part on the context where the Javascript is executed. In the Web page case (i.e., using the browser 15D) a first consideration is whether the Web page was downloaded over https (HTTP/TLS) or (second consideration) if the Web page was downloaded over http (pure HTTP, no TLS). In the standalone web application case (e.g., widget executing on web runtime) there are three additional considerations of whether the widget has trust level 2 (signer certificate can be linked to trusted CA), or if the widget has trust level 1 (self-signed, or CA certificate is not marked trusted), or if the widget has trust level 0 (not signed).

All of the various cases covered by the foregoing considerations would be allowed to obtain GBA keys, but which Ua security protocol identifier would be used would depend on the division above. Thus, in accordance with this non-limiting example there could be five Ua security protocol identifiers for use in the Web application/Web page domain. In other embodiments there could be more or less than five Ua security protocol identifiers that are defined and used.

Based on the foregoing it should be apparent that the exemplary embodiments of this invention provide a method, apparatus and computer program(s) to enhance the operation of the GBA.

Figure 6:
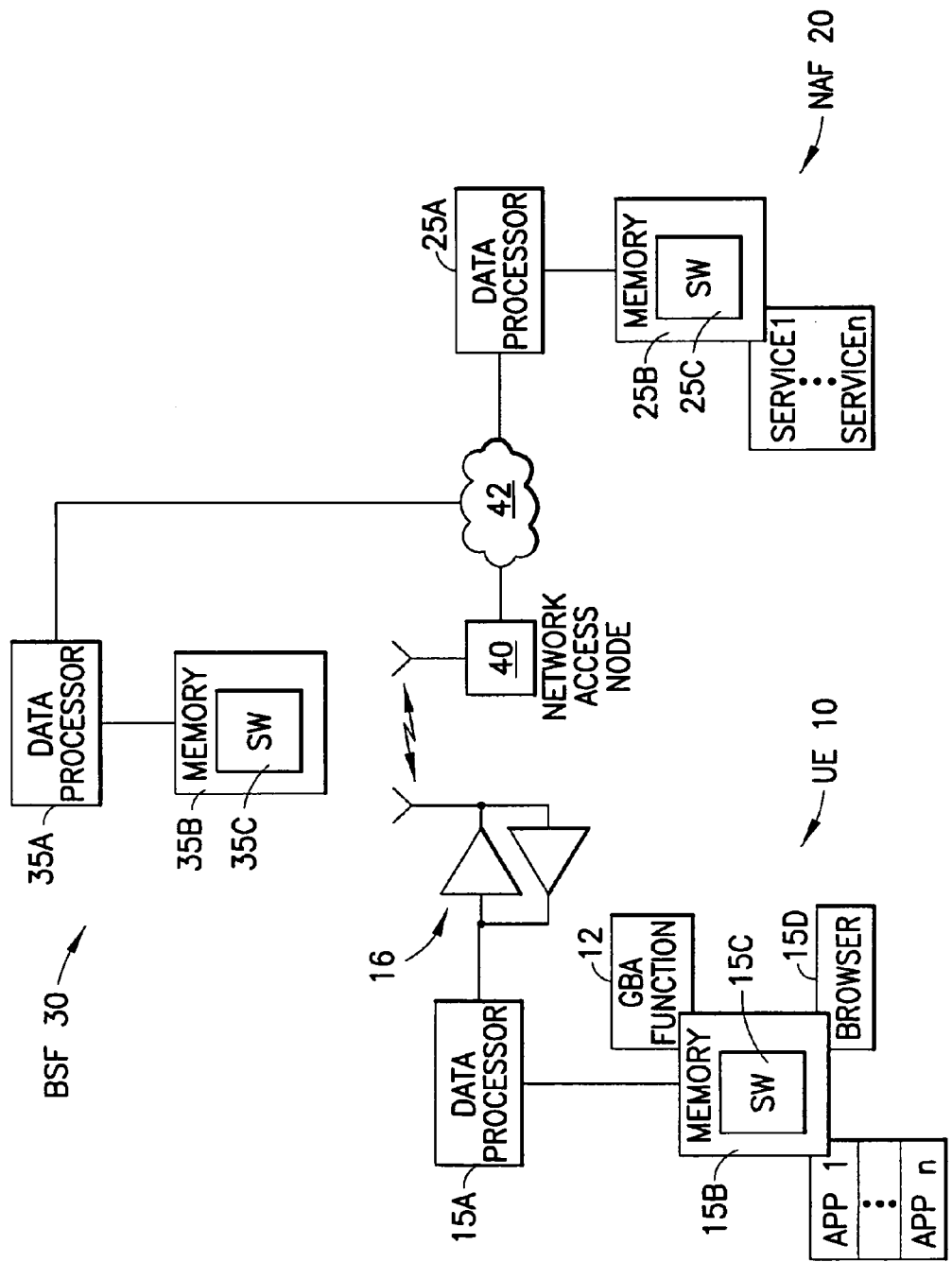
FIG. 6 illustrates a simplified block diagram of apparatus that are suitable for implementing the exemplary embodiments of the invention.

Reference can be made to FIG. 6 for illustrating a simplified block diagram of apparatus that are suitable for implementing the exemplary embodiments of the invention described above. In general, the UE 10 can include at least one data processor 15A connected with at least one memory 15B storing software (SW) 15C that is configured to execute methods and procedures in accordance with aspects of the exemplary embodiments described above, including the functionality of the GBA function 12 shown in FIG. 3. The memory 15B can also store SW implementing the various applications (app_1, app_2, ... app_n) and SW implementing a Web browser 15D. For the case of the UE 10 being a wireless device there is also provided at least one wireless transceiver (e.g., a radio frequency or an optical transceiver) configured to provide wireless connectivity with a network access node 40, such as a base station. The UE 10 is connected via the network access node 40 and a network 42 to the NAF 20 and the BSF 30, which in turn are connected with one another through the same or a different network. The NAF 20 can include at least one data processor 25A connected with at least one memory 25B storing SW 25C that is configured to execute methods and procedures in accordance with aspects of the exemplary embodiments described above, including the functionality of the NAF function 22 shown in FIG. 3. The SW 25C can also be assumed to generally fulfill the requirements of the overall NAF functionality described in, for example, 3GPP TS 33.220. The memory 25B can also store SW implementing the various services (service_1, service_2, ..., service_n). The BSF 30 can include at least one data processor 35A connected with at least one memory 35B storing SW 3C that is configured to execute methods and procedures in accordance with aspects of the exemplary embodiments described above, and to generally fulfill the requirements of the overall BSF functionality described in, for example, 3GPP TS 33.220.

It can be noted that in some embodiments the browser 15D and the GBA function 12 can be located in different (separate) devices. For example, the exemplary embodiments also encompass a case where the user is browsing from a personal computer (PC) and using, via a Bluetooth or other type of connection, the GBA function 12 in the UE 10.

Figure 7:
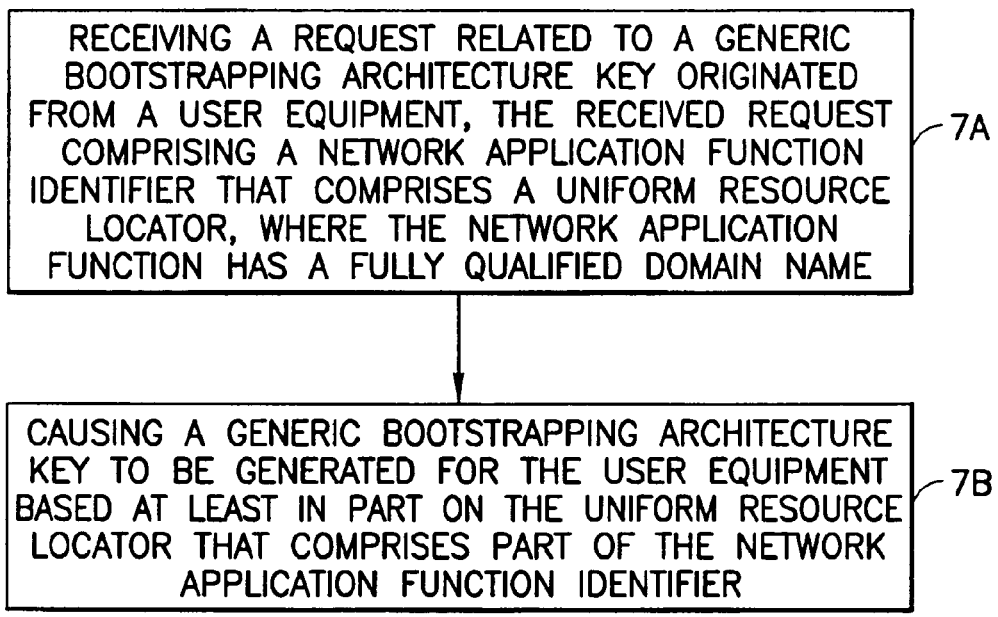
FIG. 7 is a logic flow diagram that illustrates the operation of a method, and a result of execution of computer program instructions, further in accordance with the exemplary embodiments of this invention.

FIG. 7 is a logic flow diagram that illustrates the operation of a method, and a result of execution of computer program instructions, further in accordance with the exemplary embodiments of this invention. In accordance with these exemplary embodiments a method performs, at Block 7A, a step of receiving a request related to a generic bootstrapping architecture key originated from a user equipment, the received request comprising a network application function identifier that comprises a uniform resource locator, where the network application function has a fully qualified domain name. At Block 7B there is a step of causing a generic bootstrapping architecture key to be generated for the user equipment based at least in part on the uniform resource locator that comprises part of the network application function identifier.

The various blocks shown in FIG. 7 may be viewed as method steps, and/or as operations that result from operation of computer program code, and/or as a plurality of coupled logic circuit elements constructed to carry out the associated function(s).

Also encompassed by the exemplary embodiments is an apparatus wherein a network application function has a fully qualified domain name, and where the apparatus comprises means for receiving a request related to a generic bootstrapping architecture key originated from a user equipment, the received request comprising a network application function identifier that comprises a uniform resource locator; and means for causing a generic bootstrapping architecture key to be generated for the user equipment based at least in part on the uniform resource locator that comprises part of the network application function identifier.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, funtware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

As was made apparent above, various modifications and adaptations to the foregoing exemplary embodiments of this invention may be made, and others may become apparent to those skilled in the relevant arts in view of the foregoing description, when read in conjunction with the accompanying drawings. However, any and all modifications will still fall within the scope of the non-limiting and exemplary embodiments of this invention.

It should be appreciated that the exemplary embodiments of this invention are not limited for use with any one particular type of wireless communication system, and that they may be used to advantage in a number of different wireless communication systems, including both cellular and non-cellular wireless communication systems.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:
   originating a request at a user equipment in response to a scripting language call to a user equipment platform for a generic bootstrapping architecture key;
   sending the request to a network application function, the request comprising a network application function identifier that comprises a uniform resource locator, where the network application function has a fully qualified domain name; and
   receiving at the user equipment the generic bootstrapping architecture key generated for the user equipment based at least in part on the uniform resource locator that comprises part of the network application function identifier;
   where the request is one of initiated in response to a web page being executed by the user equipment or is initiated in response to an application being executed by the user equipment, and where the uniform resource locator has appended thereto information indicating that the request is for authorized applications that are allowed to obtain the generic bootstrapping architecture key for the uniform resource locator.

2. The method of claim 1, where the network application function hosts a plurality of services, where the uniform resource locator contains a service specific part associated with one of the plurality of services.

3. The method of claim 2, further comprising processing the uniform resource locator at the user equipment to make it more generic before sending the request.

4. The method of claim 1, where the request sent to the network application function comprises a full uniform resource locator, and where the uniform resource locator is processed in the network application function.

5. The method of claim 1, where the request is initiated only if a trust level of the application is such that the application is digitally signed, and the signer has either a certificate from a certificate authority, or the signer has a self-signed certificate, and where neither of the signer or the certificate authority are designated as trusted in the user equipment.

6. The method of claim 1, further comprising processing the uniform resource locator.

7. The method as in claim 1, where the request is sent to the network application function in connection with a hypertext transfer protocol message.

8. The method as in claim 1 where the request is sent to the network application function over an interface defined between the network application function and the user equipment, and where the request comprises one of a plurality of interface security protocol identifiers associated with Web application/Web page contexts of the user equipment.

9. The method as in claim 1, where the steps of sending and receiving are performed as a result of execution by at least one data processor of computer program instructions stored on a non-transitory computer readable storage medium embodied as a memo connected with the at least one data processor.

10. An apparatus comprising:
    a processor; and
    a memory including computer program code, where the memory and computer program code are configured to, with the processor, cause the apparatus at least to,
    originate a request at a user equipment in response to a scripting language call to a user equipment platform for a generic bootstrapping architecture key;
    sending the request to a network application function, the request comprising a network application function identifier that comprises a uniform resource locator, where the network application function has a fully qualified domain name; and
    receiving at the user equipment the generic bootstrapping architecture key generated for the user equipment based at least in part on the uniform resource locator that comprises part of the network application function identifier;
    where the request is one of initiated in response to a web page being executed by the user equipment or is initiated in response to an application being executed by the user equipment, and where the uniform resource locator has appended thereto information indicating that the request is for authorized applications that are allowed to obtain the generic bootstrapping architecture key for the uniform resource locator.

11. The apparatus of claim 10, where the network application function hosts a plurality of services, where the uniform resource locator contains a service specific part associated with one of the plurality of services.

12. The apparatus of claim 11, where the uniform resource locator is processed at the user equipment to make it more generic before the request is sent.

13. The apparatus of claim 10, where the request sent to the network application function comprises a full uniform resource locator, and where the uniform resource locator is processed in the network application function to make it more generic.

14. The apparatus of claim 10, where the request is initiated only if a trust level of the application is such that the application is digitally signed, and the signer has either a certificate from a certificate authority, or the signer has a self-signed certificate, and where neither of the signer or the certificate authority are designated as trusted in the user equipment.

15. The apparatus as in claim 10, further comprising processing the uniform resource locator.

16. The apparatus as in claim 10, where the request is sent to the network application function in connection with a hypertext transfer protocol message.

17. The apparatus as in claim 10, where a web browser and a generic bootstrapping architecture function are both located in the user equipment, or where the generic bootstrapping architecture function is located in the user equipment and where the web browser is located in another device that is communicatively coupled with the user equipment.

18. The apparatus as in claim 10, where the request is sent to the network application function over an interface defined between the network application function and the user equipment, and where the request comprises one of a plurality of interface security protocol identifiers associated with Web application/Web page contexts of the user equipment.

* * * * *

UNITED STATES PATENT AND TRADEMARK OFFICE
CERTIFICATE OF CORRECTION

PATENT NO. : 8,661,257 B2  
APPLICATION NO. : 12/782199  
DATED : February 25, 2014  
INVENTOR(S) : Laitinen et al.

Page 1 of 1

It is certified that error appears in the above-identified patent and that said Letters Patent is hereby corrected as shown below:

In the Claims

In Claim 9:
Column 14, line 39, "memo" should be deleted and --memory-- should be inserted.

Signed and Sealed this
Twenty-second Day of April, 2014

Michelle K. Lee
*Deputy Director of the United States Patent and Trademark Office*